(12) United States Patent
Li et al.

(10) Patent No.: US 8,930,791 B2
(45) Date of Patent: *Jan. 6, 2015

(54) EARLY STOP METHOD AND APPARATUS FOR TURBO DECODING

(75) Inventors: Yuan Li, San Diego, CA (US); Jianbin Zhu, Poway, CA (US); Tao Zhang, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,720

(22) Filed: Sep. 10, 2012

(65) Prior Publication Data

US 2013/0007571 A1    Jan. 3, 2013

Related U.S. Application Data

(63) Continuation-in-part of application No. 12/973,951, filed on Dec. 21, 2010.

(60) Provisional application No. 61/289,958, filed on Dec. 23, 2009, provisional application No. 61/292,801, filed on Jan. 6, 2010, provisional application No. 61/289,921, filed on Dec. 23, 2009, provisional application No. 61/301,046, filed on Feb. 3, 2010.

(51) Int. Cl.
*H03M 13/00* (2006.01)
*H04L 1/00* (2006.01)

(52) U.S. Cl.
CPC ............... *H04L 1/005* (2013.01); *H04L 1/006* (2013.01)

USPC .......................................... 714/757

(58) Field of Classification Search
CPC ..................... H03M 13/2975; H04L 1/0041
USPC .......................................... 714/757
See application file for complete search history.

(56) References Cited

U.S. PATENT DOCUMENTS

| | | | | |
|---|---|---|---|---|
| 5,761,248 | A  * | 6/1998 | Hagenauer et al. | 375/340 |
| 6,578,892 | B2 * | 6/2003 | Tsimmerman | 294/67.21 |
| 6,594,792 | B1 | 7/2003 | Hladik et al. | |
| 6,675,342 | B1 * | 1/2004 | Yagyu | 714/755 |
| 6,686,853 | B2 * | 2/2004 | Shen et al. | 341/50 |
| 6,693,566 | B2 * | 2/2004 | Jaffe et al. | 341/50 |
| 6,708,948 | B2 * | 3/2004 | Nosel | 251/288 |
| 6,718,504 | B1 | 4/2004 | Coombs et al. | |
| 6,738,948 | B2 * | 5/2004 | Dinc et al. | 714/794 |
| 6,745,352 | B2 * | 6/2004 | Cheng | 714/704 |
| 6,898,254 | B2 * | 5/2005 | Wolf et al. | 375/340 |

(Continued)

OTHER PUBLICATIONS

Kim et al., IEEE Transactions on Circuits and Systems "Double-Binary Circular Turbo Decoding Based on Border Metric Encoding", vol. 55, No. 1, Jan. 2008, pp. 79-83.

*Primary Examiner* — Amine Riad (57) ABSTRACT

In one embodiment, device for early stopping in turbo decoding includes a processor configured to receive a block of data to be decoded, compare hard decision bits resulting from decoding iterations and compare a minimum value of log likelihood ratio (LLR) of decoded bits against a threshold. The processor configured to match hard-decisions with previous iteration results. The processor may be configured to set an early stop rule after the matching hard-decisions with previous iteration results is matched. The processor may be configured to set an early stop rule when the minimum reliability of the output bits exceeds the threshold.

2 Claims, 5 Drawing Sheets

(56) References Cited

U.S. PATENT DOCUMENTS

| | | | |
|---|---|---|---|
| 6,982,659 B2 * | 1/2006 | Shen et al. | 341/50 |
| 6,993,704 B2 | 1/2006 | Wolf | |
| 7,185,260 B2 | 2/2007 | Coombs et al. | |
| 7,200,799 B2 | 4/2007 | Wang et al. | |
| 7,242,726 B2 * | 7/2007 | Cameron et al. | 375/295 |
| 7,254,190 B2 * | 8/2007 | Kwentus et al. | 375/340 |
| 7,260,766 B2 * | 8/2007 | Levy et al. | 714/780 |
| 7,331,015 B2 * | 2/2008 | Hays et al. | 715/248 |
| 7,657,819 B2 * | 2/2010 | Berkmann et al. | 714/755 |
| 7,849,377 B2 * | 12/2010 | Hekstra et al. | 714/752 |
| 8,250,448 B1 | 8/2012 | Andrews | |
| 8,341,506 B2 * | 12/2012 | Li et al. | 714/780 |
| 8,468,428 B1 * | 6/2013 | Matache | 714/780 |
| 2002/0184596 A1 * | 12/2002 | Dinc et al. | 714/794 |
| 2006/0158568 A1 * | 7/2006 | Kaylani et al. | 348/725 |
| 2007/0061666 A1 | 3/2007 | Nakai | |
| 2007/0067703 A1 * | 3/2007 | Berkmann et al. | 714/794 |
| 2007/0101231 A1 | 5/2007 | Kutz et al. | |
| 2007/0234180 A1 | 10/2007 | Edmonston et al. | |
| 2008/0092010 A1 | 4/2008 | Orio | |
| 2008/0270868 A1 | 10/2008 | Shinagawa et al. | |
| 2009/0049358 A1 * | 2/2009 | Jalloul et al. | 714/752 |
| 2009/0089643 A1 * | 4/2009 | Hsieh | 714/755 |
| 2009/0300463 A1 | 12/2009 | Purkovic et al. | |
| 2011/0055657 A1 * | 3/2011 | Charpentier et al. | 714/752 |
| 2011/0107019 A1 | 5/2011 | Pan et al. | |
| 2013/0156133 A1 | 6/2013 | Gentile et al. | |
| 2013/0235957 A1 * | 9/2013 | El Khamy et al. | 375/341 |
| 2014/0064413 A1 * | 3/2014 | Huebner et al. | 375/340 |

* cited by examiner

EARLY STOP METHOD AND APPARATUS FOR TURBO DECODING

This application is a continuation-in-part of and claim priority to U.S. patent application Ser. No. 12/973,951, entitled "Method and Apparatus for Early Stop Algorithm of Turbo Decoding," which in turn claims priority to U.S. Provisional Application Ser. No. 61/289,958 entitled "A simple and efficient early stop scheme for turbo decoder" which was filed on Dec. 23, 2009; U.S. Provisional Application Ser. No. 61/292,801 entitled "A UMTS Turbo Decoder with Multiple MAP Engines," which was filed on Jan. 6, 2010; U.S. Provisional Application Ser. No. 61/289,921 entitled "A Method of Trellis Termination Handling in Turbo Decoder," which was filed on Dec. 23, 2009; and U.S. Provisional Application Ser. No. 61/301,046 entitled "A Contention Free Memory Structure and Interleaver for Parallel HSPA_LTE Turbo Decoder," which was filed on Feb. 3, 2010. Each of U.S. patent application Ser. Nos. 12/973,951, 61/289,958, 61/292,801, 61/289,921 and 61/301,046 is hereby incorporated by reference in its entirety

BACKGROUND OF THE INVENTION

1. Field of the Invention

This disclosure relates generally to receivers for communication systems, and, more particularly, to methods and apparatus to perform turbo decoding for communications receivers

2. Background

Wireless communication systems include a network infrastructure having base stations throughout a coverage area, each of which is dedicated to a cell or cell site. The base stations are controlled by base station controllers that further communicate with a mobile switching center.

The wireless networks operate according to a number of standards including Code Division Multiple Access (CDMA) standards and the Universal Mobile Telecommunications Services (UMTS) including the Wideband CDMA (WCDMA) and Long Term Evolution (LTE) standards. These standards support high throughput for both voice and data.

Turbo coding is employed in wireless and other systems to improve performance in which data is split into blocks and coded by a turbo encoder. The decoding may be conducted iteratively and each iteration of the decoder may improve the reliability of the information bits. In order to reach a sufficient decoding performance, a fixed number of iterations may be employed. In many cases, the correct decoding results may be generated with only a few iterations.

A turbo decoder uses an iterative process or algorithm including a constant number of iterations independent of the channel condition, such as the signal-to-noise ratio (SNR). The ability to dynamically determine the number of iterations is called "early stopping".

A block of data may be decoded by a turbo decoder to determine its correctness. The turbo decoder may continuously decode until a correct block is found or a maximum number of iterations is reached. For each half iteration, the decoder may produce the results for a whole block of data.

The early stopping rules may be used to save or reduce the number of iterations by checking if the decoder results are already correct. If the decoding results are correct, no more iterations need to be performed. Without early stop rules, a predefined number of iterations are be performed). If the early stopping rules are not sufficient or too complex, data throughput may be reduced and increasing battery usage.

The iterative decoding algorithms may belong to a family of iterative decoding algorithms applicable to Low Density Parity Check (LDPC) codes, turbo product codes, parallel concatenated convolutional codes, and/or serial concatenated convolutional codes.

A hard-decision comparison based algorithm has been proposed by A. Matache, S. Dolinar and F. Pollara, "Stopping Rules for Turbo Decoders", TMO Progress Report 42-142, Jet Propulsion Laboratory, Aug. 15, 2000. This algorithm compares hard-decisions of information bits from the current iteration and of the previous iteration. The decoding is stopped once hard-decisions from the previous iteration matches with those of the current iteration. This algorithm introduces large performance loss in high SNR channel conditions especially with the combination of high code rate, which makes the algorithm difficult to implement in a practical communication system. This is because practical systems, such as those using High Speed Downlink Packet Access (HSDPA), may apply a high code rate where the signal to noise ratio is significant.

Another early stop algorithm was also proposed which computes the minimum log likelihood ratio (LLR) of decoded output bits. In this algorithm, if the minimum value of LLR of all bits exceeds a certain threshold, the decoding is stopped. However, a large block error rate (BLER) performance loss is reported, when channel SNR is high.

SUMMARY

The various embodiments provided herein are generally directed to a method, system, and/or device for providing early stop techniques in turbo encoding and decoding.

In one aspect, a device for early stopping in turbo decoding includes a processor configured to receive a block of data to be decoded, compare hard decision bits resulting from decoding iterations and compare a minimum value of log likelihood ratio (LLR) of decoded bits against a threshold. The processor configured to match hard-decisions with previous iteration results. The processor may be configured to set an early stop rule after the matching hard-decisions with previous iteration results is matched. The processor may be configured to set an early stop rule when the minimum reliability of the output bits exceeds the threshold.

In another aspect, a method for early stopping in turbo decoding, comprising decoding a block of data using a iterative decoding process by comparing hard decision bits resulting from decoding iterations and comparing a minimum value of log likelihood ratio (LLR) of decoded bits against a threshold.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Each of the additional features and teachings disclosed below can be utilized separately or in conjunction with other features and teachings to provide a device, system, and/or method for early stopping in turbo decoding. Representative examples of the present invention, which utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Devices, methods, and/or systems are described for early stopping in turbo decoding which include a processor configured to receive a block of data to be decoded, compare hard decision bits resulting from decoding iterations and compare a minimum value of log likelihood ratio (LLR) of decoded bits against a threshold. The processor configured to match hard-decisions with previous iteration results. The processor may be configured to set an early stop rule after the matching hard-decisions with previous iteration results is matched. The processor may be configured to set an early stop rule when the minimum reliability of the output bits exceeds the threshold.

Figure 1:
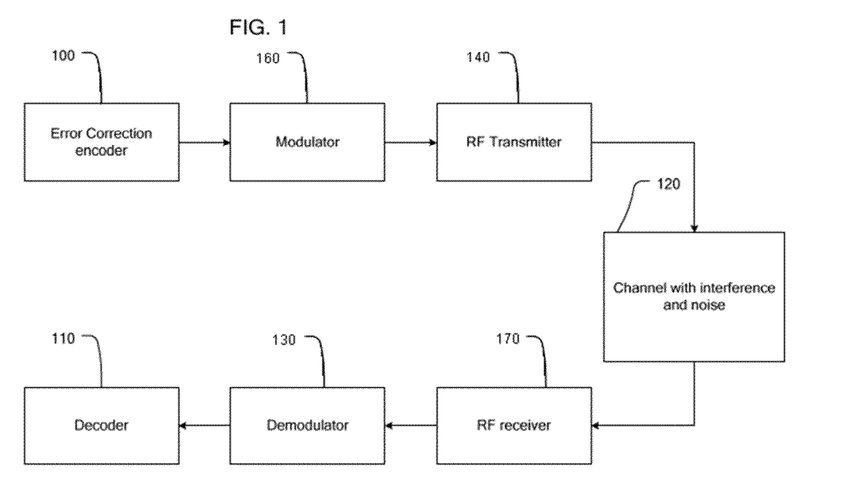
FIG. 1 is a communications system with error correction coding in an embodiment.

FIG. 1 illustrates a digital communication system including an error correction encoder 100 according to one embodiment for correcting errors in a received vector or data with an iterative decoder 110. Error-correcting codes of encoder 100 and decoding codes of decoder 110 are used to send messages over a channel.

The message may be encoded using an encoded algorithm and also modulated by a modulator 160. The turbo encoder may be used to perform channel coding. The message may then be transmitted by a transmitter 140 and subject to SNR as it is transmitted over the channel 120.

The message may arrive at the decoder 110 through a receiver 170 and a demodulator 130 as shown. It should be noted that any one of the interface to the encoder, the encoder, modulator, and/or transmitter may be formed on a single Integrated Circuit (IC). Any one of the demodulator, receiver, the decoder, and/or the interface to the decoder may be formed on a single Integrated Circuit (IC). The demodulator may demodulate the message into a sequence of discrete data symbols that is aligned with a code word that was likely sent. The decoder 110 may use a decoding algorithm based on a decoding code based on the encoding code to decode the received code word. This is repeated until a level of error correction is achieved.

Figure 2:
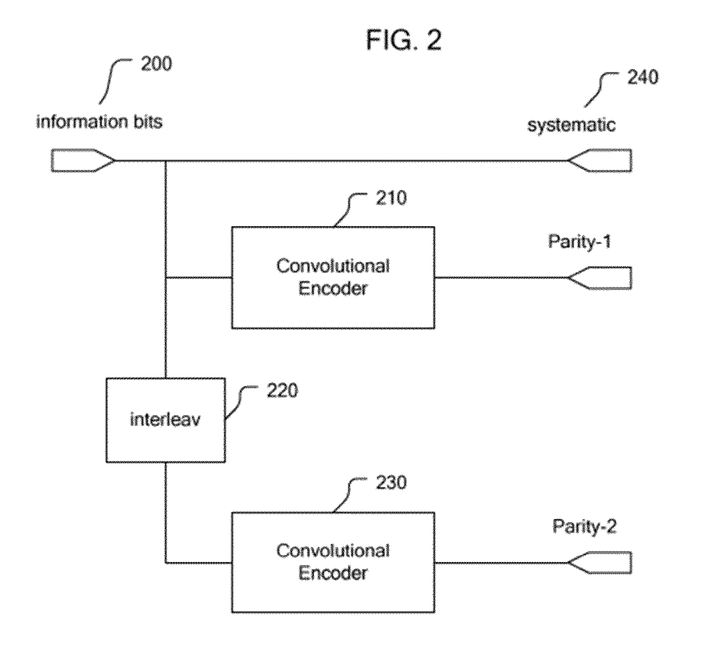
FIG. 2 is a block diagram of a turbo coder in an embodiment.

FIG. 2 illustrates an example of a turbo encoder that includes two convolutional encoders 210 and 230. Each convolutional encoder may add parity data, e.g., parity-1, parity-2. The turbo encoder may have as an input information bits 200 and systematic data 240, which is representative of the original data, such as a copy the information bits 200. The information bits may be interleaved at 220.

The resultant parity bits of the first encoder 210, the second encoder 230 and the systematic information bits 240 are transmitted over communications channels.

Figure 3:
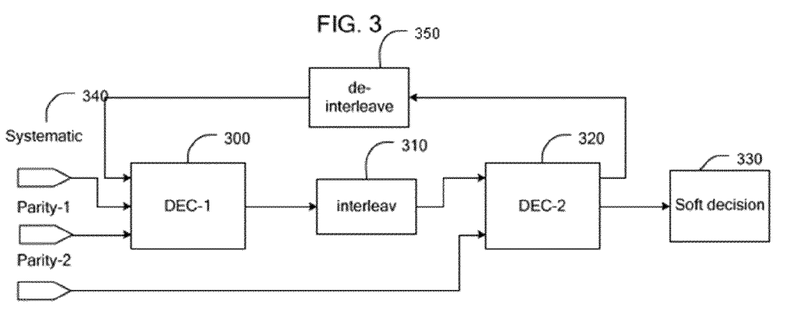
FIG. 3 a block diagram of an example iterative decoding system.

A block diagram of an example iterative decoding system is illustrated in FIG. 3. In a decoding iteration, two soft-input, soft-output (SISO) decoders may be employed. The output of the first decoder 300 may be fed into a second decoder as an input after interleaving. Similarly, the output of the second decoder 320 may be fed into the first decoder as an input.

A decoding iteration may be completed by passing information once between the DEC-1 300 to DEC-2 320 and DEC-2 320 to interleaver 310. For each decoder, MAP decoding algorithms, which generate a maximum a posterior (MAP) probability of the information bits, may be used. The decoder 300, such as a MAP decoder, may accept as soft inputs, systematic bits 340 and parity bits Parity-1 and Parity-2. The output of the decoder 320 may be fed to an de-interleaver 350. The MAP decoder may compute the soft-output decision 330 of the systematic bits using the trellis structure of the convolutional code. The soft-output may be referred to as a posterior information.

The extrinsic information may be calculated substantially concurrently and referred to as the contribution of information from the current decoding process. The extrinsic information may be de-interleaved before passing to the next decoding stage.

In the next decoding stage, the extrinsic information may be utilized as a priori information of the systematic bits and added together with the systematic information bits before decoding. This type of iteration may be repeated multiple times before the final results are given as the output. The number of iterations may depend on the SNR of the channel. For low SNR ranges, more iteration, e.g., 8 to 16, may be required. For high SNR ranges, the number of iterations may be largely reduced. A complete decoding iteration may include the processing of DEC-1 300 (half iteration) and DEC-2 320 (half iteration).

Figure 4:
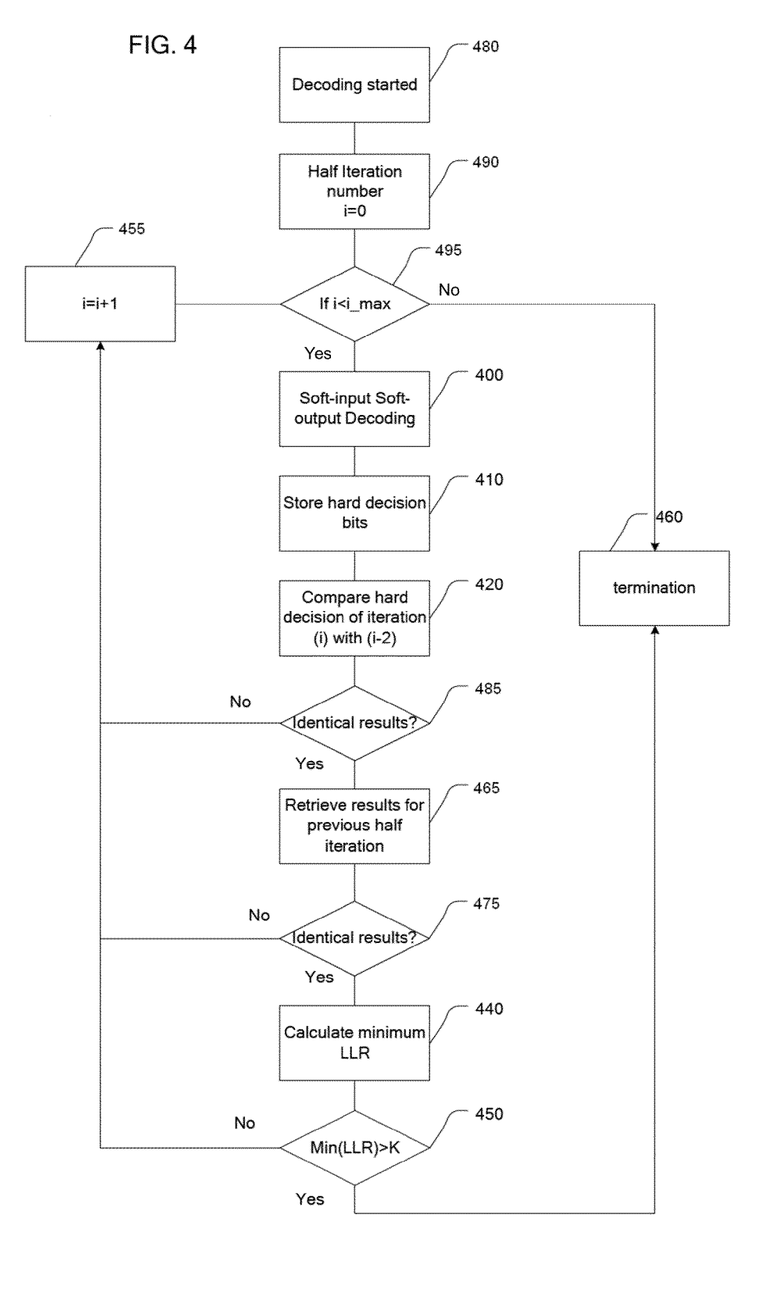
FIG. 4 illustrates an early stop method in an embodiment.

FIG. 4 illustrates a method in accordance with an embodiment. As shown, decoding starts at step 480, and the half iteration number is set to i=0 at step 490. If i<i_max at step 495 is no, then the processs proceeds to termination at step 460. If the answer at step 495 is yes, then SISO decoding occurs at step 400 and the hard decision bits are stored at step 410. In step 420, a comparison of hard decision of half iteration (i) with (i−2) is performed. If at step 485, the answer is yes and the results are identical, the comparison results from the previous half iteration (i−1 with i−3) are retrieved at step 465. If the results are not identical at step 485, the process proceeds to step 455.

The process then proceeds to step 475 to determine if the values are identical. If the results are identical, the process proceeds to step 440. If not, the process moves to step 455. At step 440, the minimum LLR may be calculated. If the output of step 450 is yes, the method is terminated, If the output of step 450 is no, then the process proceeds to 455 and then to 495 and begins again as discussed above.

Accordingly. for each half iteration number (i), the hard-decisions may be stored and compared with the hard-decisions from the previous half iteration (i−2). No comparison is performed between two consecutive half iterations due to the fact that these information bits are generated in interleaved order. For two consecutive half iterations (i) and (i+1), if both have matched hard-decisions with their previous iteration results, respectively, i.e., half iteration (i) matched with (i−2) and half iteration (i−1) matched with (i−3), then the first stop criterion or early stop rule is met. In one embodiment, it has been found that the stop criterion may operate efficiently in low code rate situations. Insufficient extrinsic information may be provided from highly punctured parity bits. Accordingly, hard decisions may not change between consecutive iterations.

The minimum LLR of all output bits may be computed and compared with a threshold K. If the minimum reliability of the output bits exceeds the threshold K, then the second stop criterion or early stop rule is met. This stop criterion may be significant where the code rate is high.

For each half iteration, the decoding may be stopped when both stop criterions are met. In one example, different code rates from ⅓ to 0.99 and different code block sizes were tested. Using the first stopping criteria alone, it has been shown that the BLER performance does not degrade for low code rates, but significant performance loss was observed for the high code rate. Using the second stopping criteria alone, the BLER performance degradation was significant especially when the code rate was low. However, combining these two stopping criteria, the BLER performance loss becomes was negligible for a given code rate.

Figure 5:
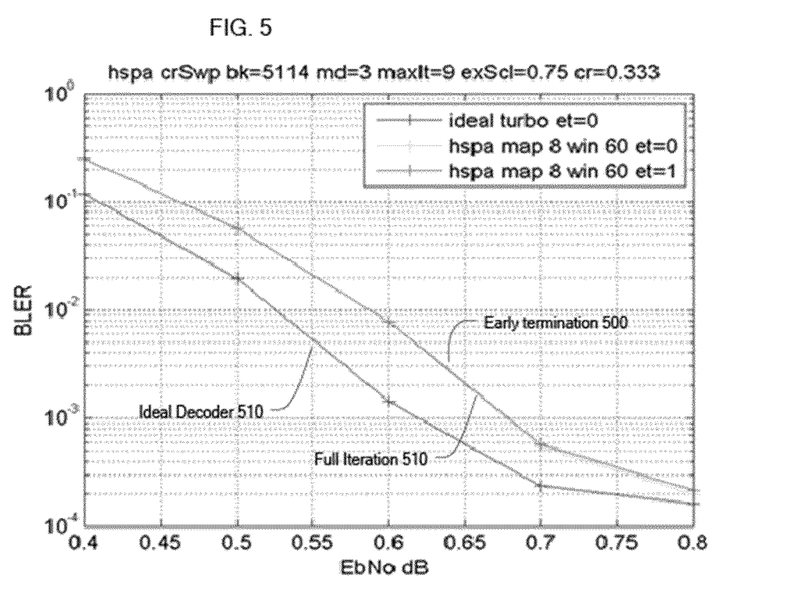
FIG. 5 illustrates a graphical performance of an early stop method at a low code rate.
Figure 6:
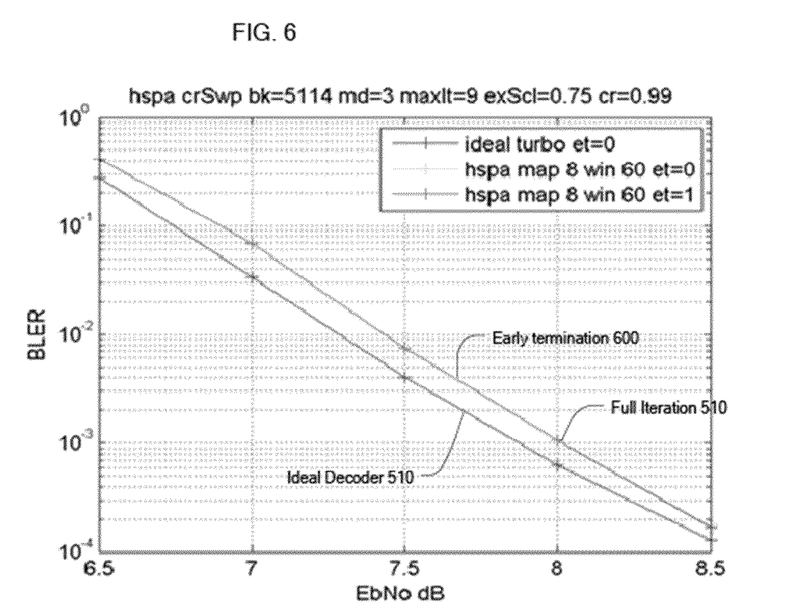
FIG. 6 illustrates a graphical performance of an early stop method at a high code rate

The performance loss of BLER is graphically illustrated in FIG. 5 when code rate is low, i.e., r=0.33 and code block size=5114. The performance loss of BLER is illustrated in FIG. 6, when code rate is high, i.e., r=0.98 and code block size=5114.

It is also noted that the encoders and decoders as well as any other processing module described herein may be formed or implemented in several ways. In one embodiment, the encoders and/or decoders or processing modules may be implemented as circuitry. In another embodiment, the embodiment the encoders and/or decoders or processing modules may be configured as software in a digital signal processor (DSP) or similar type device. In yet another embodiment, the encoders and/or decoders or processing modules may be implemented as a combination of software and hardware In other embodiments, the encoders and/or decoders or processing modules may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The encoders and/or decoders or processing modules may be coupled to a memory that is operable to store operational instructions that enable to encoders and/or decoders or processing modules to perform their function.

Such a memory may be a single memory device or a plurality of memory devices. Such a memory may be a read-only memory, random access memory, volatile memory, non-volatile memory, static memory, dynamic memory, flash memory, and/or any device that stores digital information. Note that when the encoders and/or decoders or processing modules implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The present invention or any part(s) or function(s) thereof, may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a crossover bar, or a network). Various software embodiments are described in terms of such an exemplary computer system. After reading this description, it will become apparent to a person skilled in the relevant art(s) how to implement the invention using other computer systems and/or architectures.

The foregoing description of the preferred embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . . "

It should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A device for early stopping in turbo decoding, comprising: one or more processors configured to:
   iteratively decode a received block of data by implementing a first soft-input, soft-output decoder and a second soft-input, soft-output decoder, each decoding iteration implemented including two consecutive half iterations, wherein a first half iteration comprises decoding by the first decoder and the second half iteration comprises decoding by the second decoder and wherein output of the first decoder is fed as an input into the second decoder and output of the second decoder is fed as an input into the first decoder,
   determine whether a first criterion for early stopping of the iteratively decoding is met by determining whether hard decisions of decoder output bits from first half iteration of a current decoding iteration are identical to hard decisions decoder of decoder output bits from a first half iteration of a previous decoding iteration and whether hard decisions of decoder output bits of a second half iteration of the current decoding iteration are identical to hard decisions of decoder output bits from a second half iteration of the previous decoding iteration, and
   determine whether a second criterion for early stopping of the iteratively decoding is met by determining whether a minimum value of log likelihood ratio of output decoded bits of a current decoding iteration is greater than a threshold;
   wherein the one or more processors are configured to stop the iteratively decoding after the first criterion and the second criterion are determined to be met.

2. A system for early stopping in turbo decoding, comprising:
   at least one memory;
   a decoder module coupled to the at least one memory, comprising one or more processors and configured to:
   receive a block of data to be decoded;
   iteratively decode the received block of data by implementing a first soft-input, soft-output decoder and a second soft-input, soft-output decoder, each decoding iteration implemented including two consecutive half iterations, wherein a first half iteration comprises decoding by the first decoder and the second half iteration comprises decoding by the second decoder and wherein output of the first decoder is fed as an input into the second decoder and output of the second decoder is fed as an input into the first decoder,
   determine whether a first criterion for early stopping of the iteratively decoding is met by determining whether hard decisions of decoder output bits from first half iteration of a current decoding iteration are identical to hard decisions decoder of decoder output bits from a first half iteration of a previous decoding iteration and whether hard decisions of decoder output bits of a second half iteration of the current decoding iteration are identical to hard decisions of decoder output bits from a second half iteration of the previous decoding iteration,
   determine whether a second criterion for early stopping of the iteratively decoding is met by determining whether a minimum value of log likelihood ratio of output decoded bits of a current decoding iteration is greater than a threshold; and
   stop the iteratively decoding after the first criterion and the second criterion are determined to be met.

* * * * *